(12) United States Patent
Tawaraya et al.

(10) Patent No.: US 7,589,804 B2
(45) Date of Patent: Sep. 15, 2009

(54) COLOR FILTER AND LIQUID CRYSTAL DISPLAY COMPRISING THE SAME

(75) Inventors: Seiji Tawaraya, Tokyo-To (JP);
Tomonobu Sumino, Tokyo-To (JP);
Masahiro Tatsuzawa, Tokyo-To (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 345 days.

(21) Appl. No.: 11/587,361

(22) PCT Filed: Apr. 19, 2005

(86) PCT No.: PCT/JP2005/007473

§ 371 (c)(1),
(2), (4) Date: Oct. 23, 2006

(87) PCT Pub. No.: WO2005/103803

PCT Pub. Date: Nov. 3, 2005

(65) Prior Publication Data

US 2008/0094550 A1 Apr. 24, 2008

(30) Foreign Application Priority Data

Apr. 21, 2004 (JP) ............................. 2004-125792

(51) Int. Cl.
*G02F 1/1335* (2006.01)
(52) U.S. Cl. .................................... 349/106
(58) Field of Classification Search .............. None
See application file for complete search history.

(56) References Cited

U.S. PATENT DOCUMENTS

| 5,570,214 A | 10/1996 | Abileah et al. |
| 2005/0219443 A1* | 10/2005 | Tanaka et al. ............... 349/106 |
| 2007/0247569 A1* | 10/2007 | Kitayama et al. ........... 349/106 |

FOREIGN PATENT DOCUMENTS

| JP | A 5-66399 | 3/1993 |
| JP | A 7-199176 | 8/1995 |
| JP | A 8-5979 | 1/1996 |
| JP | A 2001-194658 | 7/2001 |
| JP | A 2005-25206 | 1/2005 |

* cited by examiner

*Primary Examiner*—Sung H Pak
(74) *Attorney, Agent, or Firm*—Oliff & Berridge, PLC

(57) ABSTRACT

The present invention provides a color filter that makes a liquid crystal display satisfactorily reproduce halftone color by effectively reducing color shift that occurs when the color on the liquid crystal display is changed stepwise from white to black, and a liquid crystal display comprising the color filter. A color filter 10 comprises red, green, and blue color patterns 10R, 10G, 10B corresponding to the display areas that the respective pixels in a liquid crystal driving cell 20 form. In the color filter 10, the contrasts of the red, green, and blue color patterns 10R, 10G, 10B (the individual contrasts of the color patterns) are preferably in the following relationship. Specifically, it is preferred that the contrast $C_R$ of the red color pattern 10R, the contrast $C_G$ of the green color pattern 10G, and the contrast $C_B$ of the blue color pattern 10B fulfill the relationship $C_R<C_G<C_B$, as well as the relationship $C_R:C_G=1.0:1.2$ to $1.0:2.5$, and $C_R:C_B=1.0:1.5$ to $1.0:4.5$. The $C_R$ is preferably 700 or more.

12 Claims, 3 Drawing Sheets

COLOR FILTER AND LIQUID CRYSTAL DISPLAY COMPRISING THE SAME

BACKGROUND OF THE INVENTION

1. Field of the Invention

The present invention relates to a color filter for use in a liquid crystal display, and, more particularly, to a color filter capable of providing excellent halftone color reproducibility and a liquid crystal display comprising the same.

2. Background Art

Liquid crystal displays have so far been used mainly as personal computer monitors. In recent years, they have rapidly come to be used also as television monitors.

In the meantime, when liquid crystal displays are used as television monitors, they are used in dark environments more often as compared with the case where liquid crystal displays are used as personal computer monitors. Further, it is essential for liquid crystal displays for television monitors to lively display the color of human skin because of the nature of images to be displayed on such displays. For this reason, to improve such characteristics as contrast and halftone color reproducibility is a particularly significant problem in liquid crystal displays that are used as television monitors.

As for contrast, many material manufacturers have developed high-contrast materials, and contrast comparable to that of CRTs competitive with LCDs has come to be obtained.

As for halftone color reproducibility, on the other hand, color shift (discrepancy between the center coordinate of the chromaticity coordinates at the display of white color (the coordinate of white color) and that of the chromaticity coordinates at the display of black color (the coordinate of black color)) occurs on a conventional liquid crystal display when the color on the liquid crystal display is changed stepwise from white to black, so that the liquid crystal display has been poor in halftone color reproducibility.

The color hue, depolarizability, etc. of a color filter incorporated in the liquid crystal display is considered to be the main cause of the above problem. Paying attention not to the total contrast of a color filter but to the individual contrasts of red, green, and blue color patterns in a color filter, Japanese Laid-Open Patent Publication No. 2001-194658, for example, proposes a method of making the contrasts of the color patterns closer.

However, according to the inventors' knowledge, the method described in Japanese Laid-Open Patent Publication No. 2001-194658 cannot fully eliminate the discrepancy between the color characteristics at the display of white color and those at the display of black color, and rather worsens halftone color reproducibility.

DISCLOSURE OF THE INVENTION

The inventors made earnest studies on this respect, and, as a result, found that not only the characteristics of a color filter but also those of a backlight unit, polarizers, etc. incorporated in a liquid crystal display greatly affect halftone color reproducibility and that, to reduce these influences, it is necessary to adjust the individual contrasts of red, green, and blue color patterns in the color filter to specified values and/or make these contrasts in a specified ratio. Namely, in a liquid crystal display, a pair of polarizers is disposed in the state of crossed nicol, with a color filter sandwiched between them, and, according to the inventors' knowledge, these polarizers usually have higher transmittances for light in the wavelength range of blue than transmittances for light in the other wavelength ranges of red and green. For this reason, when backlight (light having an illuminance distribution in which peaks are present in the wavelength ranges of red, green, and blue) passes through the color filter via such polarizers, a part of the backlight (light in the wavelength range of blue) leaks due to the characteristics of the polarizers even when the color on the liquid crystal display is black, and this light is added to the light that has passed through the respective color patterns in the color filter. Color shift (discrepancy between the coordinate of white color and that of black color) thus occurs when the color on the liquid crystal display is changed from white to black.

The present invention was accomplished on the basis of the above finding. An object of the present invention is to provide a color filter that makes a liquid crystal display satisfactorily reproduce halftone color by effectively reducing color shift (discrepancy between the coordinate of white color and that of black color) that occurs when the color on the liquid crystal display is changed stepwise from white to black, and to provide a liquid crystal display comprising the color filter.

The present invention provides, as a first means for fulfilling the above object of the invention, a color filter for use in a liquid crystal display, comprising red, green, and blue color patterns, contrast $C_R$ of the red color pattern, contrast $C_G$ of the green color pattern, and contrast $C_B$ of the blue color pattern fulfilling the relationship $C_R<C_G<C_B$, as well as the relationship $C_R:C_G=1.0:1.2$ to $1.0:2.5$, and $C_R:C_B=1.0:1.5$ to $1.0:4.5$.

In the above-described first means, it is preferred that the $C_R$ and the $C_B$ fulfill the relationship $C_R:C_B=1.0:1.8$ to $1.0:3.5$, more preferably $1.0:2.0$ to $1.0:2.5$. Further, the $C_R$ is preferably 700 or more.

The present invention provides, as a second means for fulfilling the above object of the invention, a liquid crystal display comprising: a color filter according to the first means described above; a liquid crystal driving cell having a plurality of pixels that are in correspondence with the red, green, and blue color patterns in the color filter, having the function of changing, according to a voltage applied, the state of polarization of light passing through each pixel; and a pair of polarizers disposed with the color filter and the liquid crystal driving cell sandwiched between them, having the function of making the color on the liquid crystal display white by transmitting, toward an observer side, light in a first state of polarization that has passed through the liquid crystal driving cell, and of making the color on the liquid crystal display black by shielding light in a second state of polarization that has passed through the liquid crystal driving cell.

According to the present invention, the individual contrasts of the color patterns in the color filter (the contrasts of the red, green, and blue color patterns) are controlled to fulfill the relationship $C_R<C_G<C_B$, as well as the relationship $C_R:C_G=1.0:1.2$ to $1.0:2.5$, and $C_R:C_B=1.0:1.5$ to $1.0:4.5$, where the $C_R$ is the contrast of the red color pattern, the $C_G$ is the contrast of the green color pattern, and the $C_B$ is the contrast of the blue color pattern, so that even if a part of light applied from a backlight unit (light in the wavelength range of blue) leaks due to the characteristics of the polarizers when the color on the liquid crystal display in which the color filter is incorporated is black, the characteristics of the color filter compensate for the color shift caused by this leakage of the light. Therefore, color shift (discrepancy between the coordinate of white color and that of black color) does not occur when the color on the liquid crystal display is changed stepwise from white to black, and the display can satisfactorily reproduce halftone color.

BEST MODE FOR CARRYING OUT THE INVENTION

Embodiments of the present invention will be described hereinafter with reference to the accompanying drawings.

First, a liquid crystal display in which a color filter according to an embodiment is incorporated will be described with reference to FIG. 6.

Figure 6:
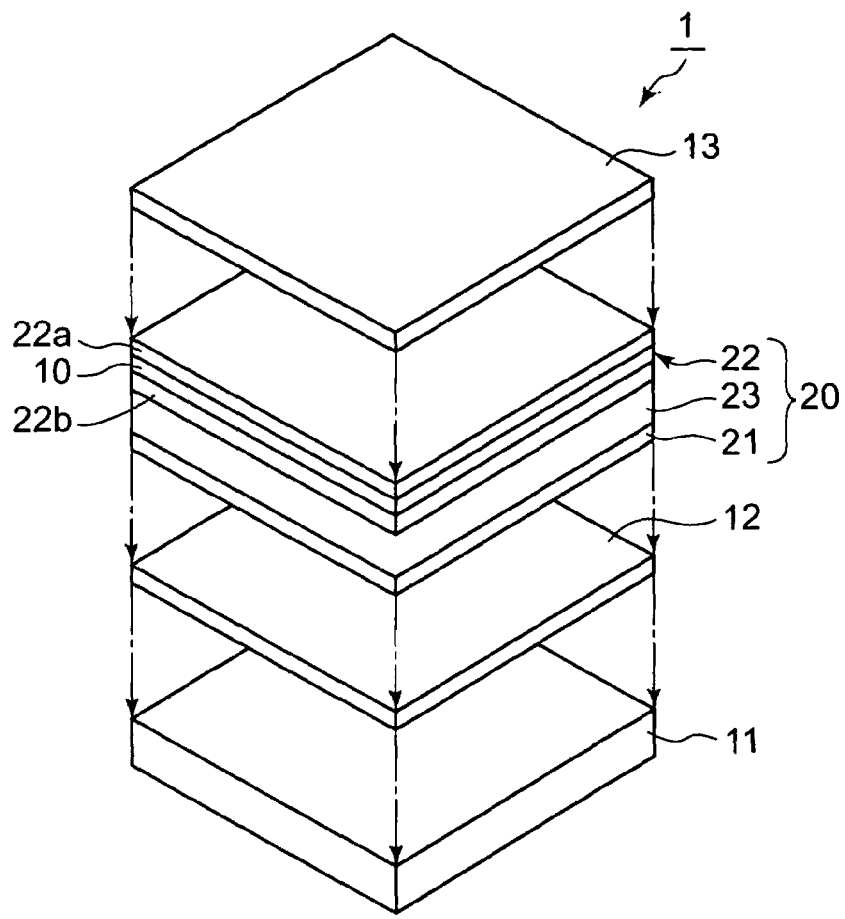
FIG. 6 is a view showing a liquid crystal display in which the color filter shown in FIG. 1 is incorporated.

As shown in FIG. 6, a liquid crystal display 1 according to this embodiment comprises a backlight unit 11, and a liquid crystal driving cell 20 having the function of changing, according to a voltage applied, the state of polarization of light applied from the backlight unit 11, passing through each pixel. The liquid crystal driving cell 20 comprises a pair of electrode substrates 21, 22, and a liquid crystal layer 23 placed between the electrode substrates 21, 22.

The liquid crystal driving cell 20 is provided with, on its sides, a pair of polarizers 12, 13 disposed in the state of crossed nicol, with the liquid crystal driving cell 20 sandwiched between them, and therefore, the color on the liquid crystal display can be made white by transmitting, toward the observer side, light in the first state of polarization that has passed through the liquid crystal driving cell 20 and the color on the liquid crystal display can be made black by shielding light in the second state of polarization that has passed through the liquid crystal driving cell 20.

A color filter 10 is incorporated in the electrode substrate 22 that is a component of the liquid crystal driving cell 20, placed on the observer side. Specifically, as shown in FIG. 6, the color filter 10 and a transparent electrode film 22b are laminated to a glass substrate 22a in the order mentioned, and, owing to this structure, light passes selectively through the red, green, and blue color patterns formed in correspondence with the pixels in the liquid crystal driving cell 20, thereby achieving color display.

Next, the color filter 10 incorporated in the liquid crystal display 1 shown in FIG. 6 will be described in detail with reference to FIGS. 1 to 5.

Figure 1:
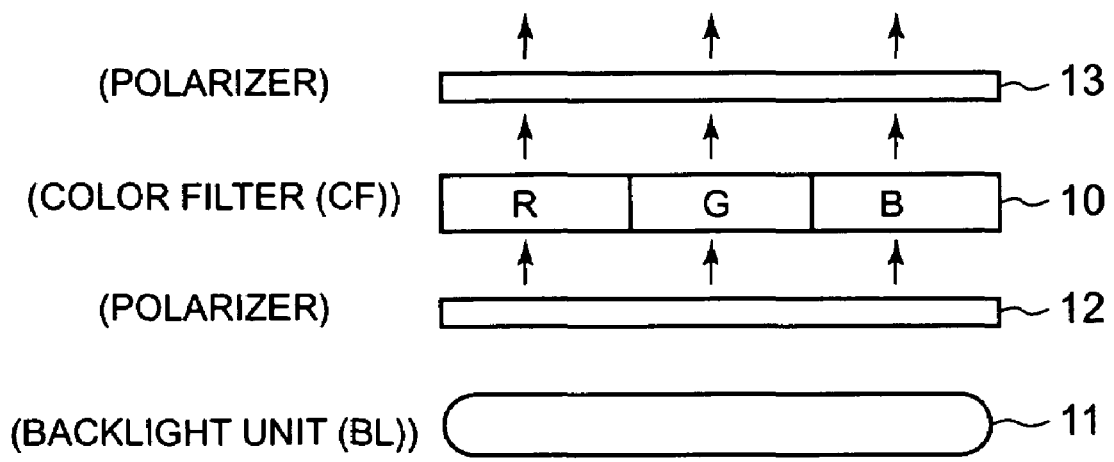
FIG. 1 is a view for explaining a color filter according to an embodiment of the present invention.

As shown in FIG. 1, the color filter 10 comprises red, green, and blue color patterns 10R, 10G, 10B corresponding to the display areas that the respective pixels in the liquid crystal driving cell 20 form. A resin useful as a base in which a red, green, or blue pigment has been dispersed can be used to form the red, green, or blue color pattern 10R, 10G, 10B.

Examples of the resin useful as a base include ethylene-vinyl acetate copolymers, ABS resins, polymethacrylic acid resins, ethylene-methacrylic acid copolymers, polyvinyl chloride resins, chlorinated vinyl chloride resins, polyvinyl alcohol, cellulose acetate propionate, cellulose acetate butyrate, nylon 6, nylon 66, nylon 12, polyethylene terephthalate, polybutylene terephthalate, polycarbonate, polyvinyl acetal, polyphenylene sulfide, polyallylate, polyvinyl butyral, epoxy resins, phenoxy resins, polyimide resins, polyamic acid resins, and phenol resins.

The resin useful as a base also includes polymers or copolymers of one or more polymerizable monomers selected from the group consisting of (meth)acrylate, ethyl (meth)acrylate, n-propyl (meth)acrylate, isopropyl (meth)acrylate, sec-butyl (meth)acrylate, isobutyl (meth)acrylate, tert-butyl (meth)acrylate, n-pentyl (meth)acrylate, n-hexyl (meth)acrylate, 2-ethylhexyl (meth)acrylate, n-octyl (meth)acrylate, n-decyl (meth)acrylate, styrene, α-methylstyrene, N-vinyl-2-pyrrolidone, and glycidyl (math)acrylate, or of one or more monomers selected from the group consisting of (meth)acrylic acid, acrylic acid dimers (e.g., M-5600 manufactured by To a Gosei Chemical Industry Co., Ltd., Japan), itaconic acid, crotonic acid, maleic acid, fumaric acid, and vinyl acetate, and anhydrides of these monomers.

Further, polymers obtained by adding ethylenically unsaturated compounds having glycidyl or hydroxyl group to the above-described copolymers can also be mentioned as examples of the resin useful as a base.

The above-enumerated resins are preferably used as the resin for a base, and, of these resins, those ones having ethylenically unsaturated bond are particularly preferred because they form crosslinkage together with monomers to provide high strength.

It is herein preferred that the contrast of the whole color filter 10 (hereinafter also referred to as the "total contrast") be 1000 or more.

The term "the total contrast of the color filter 10" as used herein means the contrast of the whole color filter including the red, green, and blue color patterns 10R, 10G, 10B. This contrast is determined by measuring the luminance of light that has passed through the entire area of the red, green, and blue color patterns 10R, 10G, 10B in the color filter 10.

Figure 2:
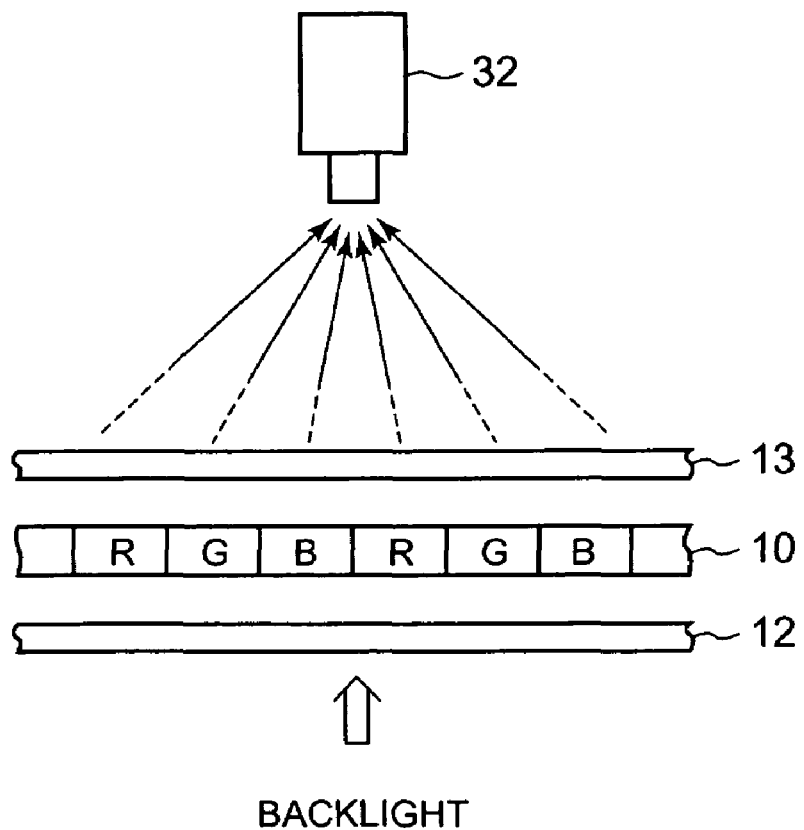
FIG. 2 is a view showing an example of method for measuring the total contrast of the color filter shown in FIG. 1.

FIG. 2 is a view showing a method for measuring the total contrast of the color filter 10. As FIG. 2 shows, the color filter 10 is sandwiched between a pair of polarizers 12, 13. The backlight applied to the color filter 10 from the side of the polarizer 12 passes successively through the polarizer 12, the color filter 10, and the polarizer 13, and is then condensed by a prescribed optical system (not shown in the figure) and enters a luminance meter 32. In such a system of measurement, the backlight is first applied to the color filter 10 from the side of the polarizer 12, with directions in which the polarizers 12, 13 polarize light being maintained parallel to each other, and the luminance (luminance at the display of white color) $A_1$ of the light that has passed through the whole areas of the red, green, and blue color patterns 10R, 10G, 10B in the color filter 10 is measured. Subsequently, the backlight is applied to the color filter 10 from the side of the polarizer 12, with the directions in which the polarizers 12, 13 polarize light being maintained perpendicular to each other (the crossed nicol state), and the luminance (luminance at the display of black color) $A_2$ of the light that has passed through the whole areas of the red, green, and blue color patterns 10R, 10G, 10B in the color filter 10 is measured. In this way, there can be obtained the total contrast of the color filter 10 as $A_1/A_2$ by calculation. In this measurement, if the chromaticity at a time when the directions in which the polarizers 12, 13 polarize light are parallel with each other, and the chromaticity at a time when the directions in which the polarizers 12, 13 polarize light are perpendicular to each other (the crossed nicol state) are respectively determined, the quantity of color shift (the distance between the coordinate of white color and that of black color) Δxy can be calculated using the chromaticity coordinates (the center coordinate (x1, y1) determined when the directions in which the polarizers 12, 13 polarize light are parallel with each other, and the center coordinate (x2, y2) determined when the directions in which the polarizers 12, 13 polarize light are perpendicular to each other) by the following equation:

$$\Delta xy = ((x1-x2)^2 + (y1-y2)^2)^{1/2}.$$

The term "(chromaticity) coordinates" as used herein means the chromaticity coordinates (x, y) in the CIE standard colorimetric system.

It is also preferred that the contrasts of the red, green, and blue color patterns 10R, 10G, 10B in the color filter 10 (hereinafter also referred to as "individual contrasts") be in the following relationship. Specifically, the contrast $C_R$ of the red color pattern 10R, the contrast $C_G$ of the green color pattern 10G, and the contrast $C_B$ of the blue color pattern 10B fulfill the relationship $C_R < C_G < C_B$. Further, it is preferred that the $C_R$, the $C_G$, and the $C_B$ fulfill the relationship $C_R : C_G = 1.0:1.2$ to $1.0:2.5$, and $C_R : C_B = 1.0:1.5$ to $1.0:4.5$. It is more preferred that the $C_R$ and the $C_B$ fulfill the relationship $C_R : C_B = 1.0:1.8$ to $1.0:3.5$, more preferably $C_R : C_B = 1.0:2.0$ to $1.0:2.5$. Furthermore, the $C_R$ is preferably 700 or more. The individual contrasts of the color patterns 10R, 10G, 10B in the color filter 10 can be controlled by the type, concentration, mean particle diameter, or the like of a pigment to be dispersed in a resin serving as the base of each color pattern.

The individual contrasts of the color patterns in the color filter 10 herein refer to the contrasts of the red, green and blue color patterns 10R, 10G, 10B that are individually evaluated. The individual contrast of each color pattern is determined by measuring the luminance of light that has passed through only the area of the color pattern, the object of evaluation, in the color filter 10.

Figure 3:
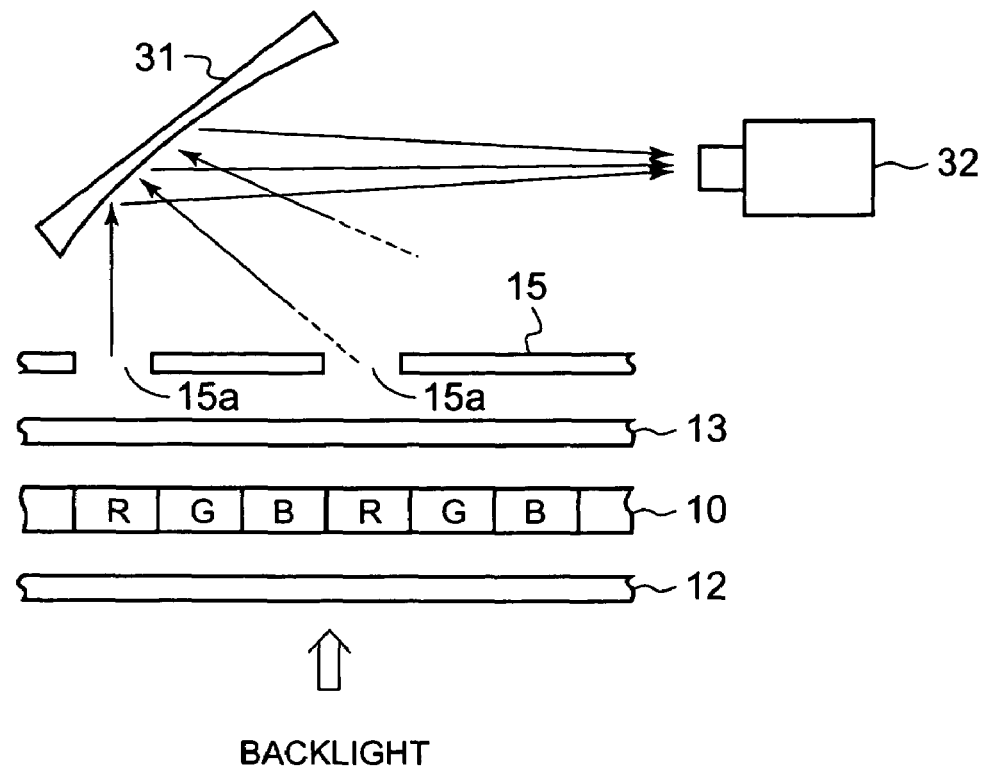
FIG. 3 is a view showing an example of method for measuring the individual contrasts of the color patterns in the color filter shown in FIG. 1.

FIG. 3 is a view showing a method for measuring the individual contrasts of the color patterns in the color filter 10. As FIG. 3 shows, the color filter 10 is sandwiched between a pair of polarizers 12, 13. The backlight applied to the color filter 10 from the side of the polarizer 12 passes successively through the polarizer 12, the color filter 10, the polarizer 13, and the opening 15a of a mask 15, and is then condensed by a prescribed optical system (not shown in the figure) and a concave mirror 31, and enters a luminance meter 32. The mask 15 is for shielding the area other than the area of a color pattern (the area corresponding to the opening 15a), the object of evaluation, in the color filter 10. In such a system of measurement, the backlight is applied to the color filter 10 from the side of the polarizer 12, with directions in which the polarizers 12, 13 polarize light being maintained parallel to each other, and the luminance (luminance at the display of white color) $B_1$ of the light that has passed through the area of a color pattern (the red color pattern 10R, in this case), the object of evaluation, in the color filter 10 is measured. Subsequently, the backlight is applied to the color filter 10 from the side of the polarizer 12, with the directions in which the polarizers 12, 13 polarize light being maintained perpendicular to each other (in the crossed nicol state), and the luminance (luminance at the display of black color) $B_2$ of the light that has passed through the area of the color pattern, the object of evaluation, in the color filter 10 is measured. In this way, the contrast of the light that has passed through the area of the color pattern, the object of evaluation, in the color filter 10 can be obtained as $B_1/B_2$ by calculation.

Halftone color reproducibility of the liquid crystal display 1 shown in FIG. 6 is determined by the center coordinate of the chromaticity coordinates at a time when the color on the liquid crystal display 1 is white (the coordinate of white color) and the center coordinate of the chromaticity coordinates at a time when the color on the liquid crystal display 1 is black (the coordinate of black color). When the coordinate of white color and that of black color are the same on the liquid crystal display 1, color shift (discrepancy between the coordinate of white color and that of black color) does not occur even when the color on the liquid crystal display 1 is changed stepwise from white to black, and the liquid crystal display 1 can satisfactorily reproduce halftone color. The coordinate of white or black color on the liquid crystal display 1 is determined by the chromaticity and luminance of the respective colors of red, green, and blue at a time when the color on the liquid crystal display 1 is white or black. More specifically, the coordinate of white color on the liquid crystal display 1 is determined chiefly by the resist color characteristics of the color filter 10 and by the illuminance distribution of the backlight 11. On the other hand, the coordinate of black color on the liquid crystal display 1 is determined by the depolarizability of each color, and is determined by, in addition to the resist color characteristics and resist depolarizability of the color filter 10, the transmittance distribution of the polarizers 12, 13, the illuminance distribution of the backlight 11, and so forth.

Figure 4:
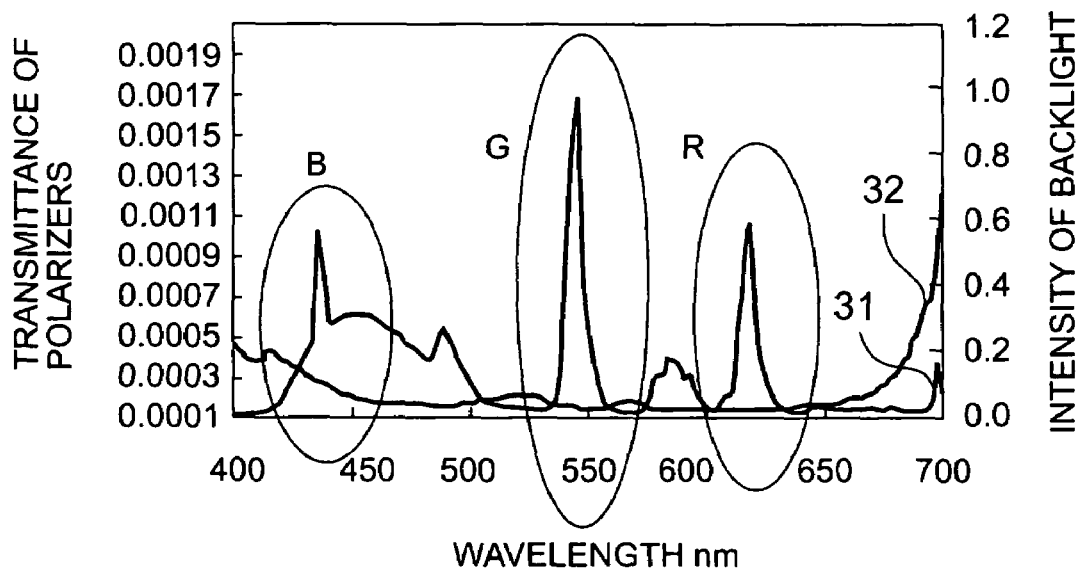
FIG. 4 is a diagram showing the characteristics of polarizers and backlight that are used together with the color filter shown in FIG. 1.
Figure 5:
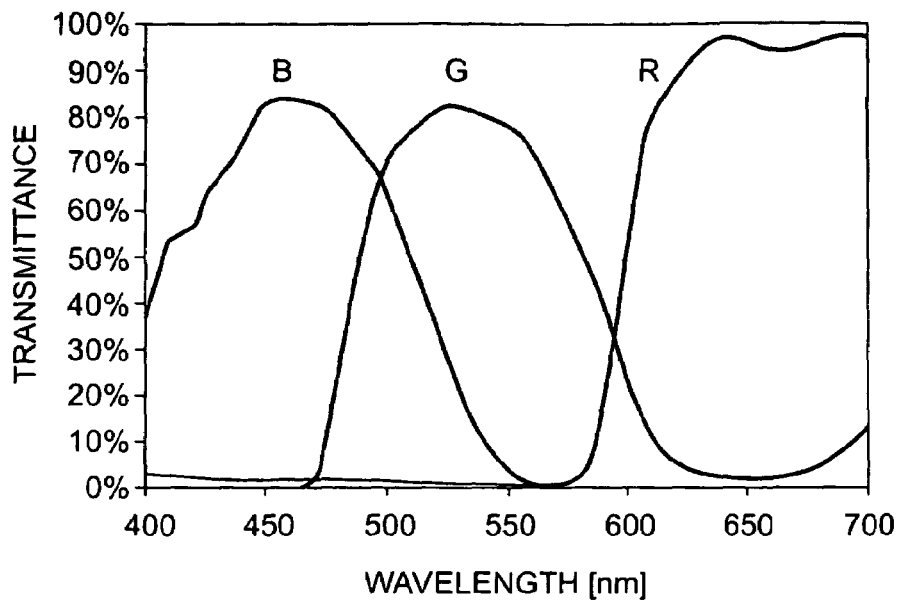
FIG. 5 is a diagram showing the characteristics of the color filter shown in FIG. 1.

In the liquid crystal display 1 shown in FIG. 6, the backlight 11 has an illumination distribution indicated by reference numeral 31 in FIG. 4, and has peaks in the wavelength ranges of red, green, and blue. On the other hand, the polarizers 12, 13 have a transmittance distribution indicated by reference numeral 32 in FIG. 4, and transmittances in both short and long wavelength ranges are higher than those in the rest of the wavelength range. Transmittances of the respective color patterns 10R, 10G, 10B in the color filter 10 are as shown in FIG. 5.

As is clear from the relationship indicated by reference numeral 31 and the one indicated by reference numeral 32 in FIG. 4, the wavelength range in which the polarizers 12, 13 show high transmittances partly overlaps with the wavelength range of blue, which is included in the wavelength range of the light applied from the backlight unit 11. Therefore, when the light applied from the backlight unit 11 passes through the color filter via these polarizers 12, 13, a part of this light (light in the wavelength range of blue) leaks due to the characteristics of the polarizers 12, 13 even when the color on the liquid crystal display 1 is black, and is added to the light that has passed through the respective color patterns 10R, 10G, 10B in the color filter 10. For this reason, color shift (discrepancy between the coordinate of white color and that of black color) unfavorably occurs, depending on the color hue and depolarizability of the color filter 10, when the color on the liquid crystal display 1 is changed stepwise from white to black, and thus the liquid crystal display 1 cannot satisfactorily reproduce halftone color.

With consideration for the above-described respect, the individual contrasts of the color patterns (the contrasts of the red, green, and blue color patterns 10R, 10G, 10B) in the color filter 10 of this embodiment are so controlled as to fulfill the above specified relationship. Namely, the individual contrasts are controlled so that they fulfill the relationship $C_R < C_G < C_B$, as well as the relationship $C_R : C_G = 1.0:1.2$ to $1.0:2.5$, and $C_R : C_B = 1.0:1.5$ to $1.0:4.5$, where the $C_R$ is the contrast of the red color pattern 10R, the $C_G$ is the contrast of the green color pattern 10G, and the $C_B$ is the contrast of the blue color pattern 10B. When the individual contrasts are so controlled, color shift (discrepancy between the coordinate of white color and that of black color) does not occur when the color on the liquid crystal display is changed stepwise from white to black, and the liquid crystal display can satisfactorily reproduce halftone color. In this case, it is preferred that the quantity of color shift (the distance between the coordinate of white color and that of black color) Δxy fulfills the relationship of Δxy<0.075.

Thus, according to this embodiment, the individual contrasts of the color patterns in the color filter 10 (the contrasts of the red, green, and blue color patterns 10R, 10G, 10B) fulfill the relationship $C_R<C_G<C_B$, as well as the relationship $C_R:C_G=1.0:1.2$ to $1.0:2.5$, and $C_R:C_B=1.0:1.5$ to $1.0:4.5$, where the $C_R$ is the contrast of the red color pattern 10R, the $C_G$ is the contrast of the green color pattern 10G, and the $C_B$ is the contrast of the blue color pattern 10B, so that even if a part of light (light in the wavelength range of blue) applied from the backlight unit 11 leaks due to the characteristics of the polarizers 12, 13 when the color on the liquid crystal display 1 in which the color filter 10 is incorporated is black, the characteristics of the color filter 10 compensate for the color shift that occurs due to the above leakage of the light. For this reason, color shift (discrepancy between the coordinate of white color and that of black color) does not occur when the color on the liquid crystal display is changed stepwise from white to black, and thus the liquid crystal display can satisfactorily reproduce halftone color.

EXAMPLES

Next, Examples of the above-described embodiments will be given below.

Example 1

(Preparation of Curable Resin Composition)

63 parts by weight of methyl methacrylate (MMA), 12 parts by weight of acrylic acid (AA), 6 parts by weight of 2-hydroxyethyl methacrylate (HEMA), and 88 parts by weight of diethylene glycol methyl ether (DMDG) were placed in a polymerizer, and the mixture was stirred for dissolution. 7 parts by weight of 2,2'-azobis(2-methylbutyronitrile) was then added to and homogeneously dissolved in the above solution. Subsequently, the solution was stirred at 85° C. for 2 hours in a stream of nitrogen and was then held at 100° C. for 1 hour for reaction. To this solution were added 7 parts by weight of glycidyl methacrylate (GMA), 0.4 parts by weight of triethylamine, and 0.2 parts by weight of hydroquinone, and the mixture was stirred at 100° C. for 5 hours, thereby obtaining a copolymer resin solution (solid matter 50%).

Next, a curable resin composition was prepared by stirring, at room temperature, the above-obtained copolymer resin solution (solid matter 50%) together with the following materials:

(1) the copolymer resin solution (solid matter 50%): 16 parts by weight,
(2) dipentaerythritol pentaacrylate (SR399 manufactured by Sartomer Company Inc.): 24 parts by weight,
(3) epoxy-orthocresol novolak resin (Epicoat 180S70 manufactured by Yuka Shell Epoxy Co., Ltd., Japan): 4 parts by weight,
(4) 2-methyl-1-(4-methylthiophenyl)-2-morpholinopropan-1-one: 4 parts by weight, and
(5) diethylene glycol dimethyl ether: 52 parts by weight.

(Formation of Light-Shielding Layer)

Thereafter, the following ingredients in the following amounts were mixed and well dispersed in a sand mill, thereby obtaining a black pigment fluid dispersion:

(1) a black pigment: 23 parts by weight,
(2) a polymer dispersing agent (Disperbyk 111 manufactured by BYK-Cemie Japan K.K., Japan): 2 parts by weight, and
(3) a solvent (diethylene glycol dimethyl ether): 75 parts by weight.

Next, a composition for forming a light-shielding layer was prepared by well mixing the above black pigment fluid dispersion together with the following ingredients:

(1) the black pigment fluid dispersion: 61 parts by weight,
(2) the above curable resin composition: 20 parts by weight, and
(3) diethylene glycol dimethyl ether: 30 parts by weight.

The above composition for forming a light-shielding layer was applied, by spin coating, to a glass substrate with a thickness of 1.1 mm (AN material, manufactured by Asahi Glass Co., Ltd., Japan), and was dried at 100° C. for 3 minutes to form a light-shielding layer with a thickness of approximately 1 μm.

Thereafter, the light-shielding layer thus formed was exposed light-shielding-pattern-wise to light from an extra-high pressure mercury vapor lamp, and was then developed with a 0.05 wt. % aqueous potassium hydroxide solution. The glass substrate with this light-shielding layer was allowed to stand in an atmosphere at 180° C. for 30 minutes for thermal treatment, thereby forming a light-shielding layer (black matrix) in the light-shielding area excluding the area in which colored layers should be formed.

(Formation of Colored Layers)

A red-colored, curable resin composition having the following formulation was applied, by spin coating, to the glass substrate with the light-shielding layer to a coating thickness of 1.5 μm, and was then dried in an oven at 70° C. for 3 minutes, thereby forming a coating film of the red-colored, curable resin composition.

Thereafter, a photomask was placed at a point 100 μm distant from the coating film of the red-colored, curable resin composition, and, by the use of a proximity aligner, ultraviolet light from a 2.0 kW extra-high pressure mercury vapor lamp was applied for 10 seconds only to the area in which red-colored layers (red pixels) should be formed.

Subsequently, the glass substrate with the coating film was immersed in a 0.05 wt. % aqueous potassium hydroxide solution (liquid temperature 23° C.) for 1 minute for development, thereby removing only the uncured portions of the coating film of the red-colored, curable resin composition.

This glass substrate with the coating film was placed in an atmosphere at 180° C. for 30 minutes for thermal treatment, thereby forming a red-colored relief pattern in the area in which red-colored layers (red pixels) should be formed.

In the same procedure as the above-described one in which the red-colored relief pattern was formed, a green-colored relief pattern was formed, by the use of a green-colored, curable resin composition having the following formulation, in the area in which green-colored layers (green pixels) should be formed.

Further, in the same procedure as the above-described one in which the red-colored relief pattern was formed, a blue-colored relief pattern was formed, by the use of a blue-colored, curable resin composition having the following formulation, in the area in which blue-colored layers (blue pixels) should be formed.

a. Formulation of Red-Colored, Curable Resin Composition
  (1) C.I. Pigment red 177:10 parts by weight
  (2) Polysulfonic acid polymer dispersing agent: 3 parts by weight
  (3) The above curable resin composition: 5 parts by weight
  (4) 3-Methoxybutyl acetate: 82 parts by weight b. Formulation of Green-Colored, Curable Resin Composition
  (1) C.I. Pigment green 36:10 parts by weight
  (2) Polysulfonic acid polymer dispersing agent: 3 parts by weight
  (3) The above curable resin composition: 5 parts by weight
  (4) 3-Methoxybutyl acetate: 82 parts by weight c. Formulation of Blue-Colored, Curable Resin Composition
  (1) C.I. Pigment blue 15:6:10 parts by weight
  (2) Polysulfonic acid polymer dispersing agent: 3 parts by weight
  (3) The above curable resin composition: 5 parts by weight
  (4) 3-Methoxybutyl acetate: 82 parts by weight (Formation of Protective Layer)

The above-described curable resin composition was applied, by spin coating, to the substrate on which the colored layers had been formed, and was dried to form a coating film with a thickness of 2 μm.

Thereafter, a photomask was placed at a point 100 μm distant from the coating film of the curable resin composition, and, by the use of a proximity aligner, ultraviolet light from a 2.0 kW extra-high pressure mercury vapor lamp was applied for 10 seconds only to the area in which a protective layer should be formed.

Subsequently, the glass substrate with the coating film was immersed in a 0.05 wt. % aqueous potassium hydroxide solution (liquid temperature 23° C.) for 1 minute for development, thereby removing only the uncured portions of the coating film of the curable resin composition.

The glass substrate with the coating film was placed in an atmosphere at 200° C. for 30 minutes for thermal treatment, thereby forming a protective layer.

(Formation of Spacer)

The above-described curable resin composition was applied, by spin coating, to the substrate on which the colored layers and the protective layer had been formed, and was then dried to form a coating film with a thickness of 3.8 μm.

Thereafter, a photomask was placed at a point 100 μm distant from the coating film of the curable resin composition, and, by the use of a proximity aligner, ultraviolet light from a 2.0 kW extra-high pressure mercury vapor lamp was applied for 10 seconds only to the area in which a spacer should be formed.

Subsequently, the glass substrate with the coating film was immersed in a 0.05 wt. % aqueous potassium hydroxide solution (liquid temperature 23° C.) for 1 minute for development, thereby removing only the uncured portions of the coating film of the curable resin composition.

This glass substrate with the coating film was placed in an atmosphere at 200° C. for 30 minutes for thermal treatment, thereby forming a spacer with a height of 3.8 μm.

Thus, there was produced a color filter having red, green, and blue color patterns on the surface of the glass substrate.

The contrast of the whole color filter produced in the above-described manner (total contrast), measured by the method shown in FIG. 2, was 1101. Further, the contrasts of the red, green, and blue color patterns in the above-obtained color filter (the individual contrasts of the color patterns) were measured by the method shown in FIG. 3. The results were as follows: $C_R=773$, $C_G=1202$, and $C_B=1956$; these contrasts were in the following ratio: $C_R:C_G:C_B=1.0:1.6:2.5$. A luminance meter used in the above measurements was a spectroradiometer SR-3 manufactured by Topcon Engineering Co., Ltd., Japan.

Example 2

A color filter was produced in the same manner as in Example 1, except that the contrasts of the red, green, and blue color patterns in the color filter (the individual contrasts of the color patterns) were changed by controlling the particle diameters of the pigments to be dispersed in the red-, green-, and blue-colored curable resin compositions. In Example 2, the individual contrasts of the color patterns were as follows: $C_R=791$, $C_G=1761$, and $C_B=3130$; and they were in the following ratio: $C_R:C_G:C_B=1.0:2.2:4.0$.

Example 3

A color filter was produced in the same manner as in Example 1, except that the contrasts of the red, green, and blue color patterns in the color filter (the individual contrasts of the color patterns) were changed by controlling the particle diameters of the pigments to be dispersed in the red-, green-, and blue-colored curable resin compositions. In Example 3, the individual contrasts of the color patterns were as follows: $C_R=989$, $C_G=1297$, and $C_B=1565$; and they were in the following ratio: $C_R:C_G:C_B=1.0:1.3:1.6$.

Example 4

A color filter was produced in the same manner as in Example 1, except that the contrasts of the red, green, and blue color patterns in the color filter (the individual contrasts of the color patterns) were changed by controlling the particle diameters of the pigments to be dispersed in the red-, green-, and blue-colored curable resin compositions. In Example 4, the individual contrasts of the color patterns were as follows: $C_R=1087$, $C_G=1332$, and $C_B=2087$; and they were in the following ratio: $C_R:C_G:C_B=1.0:1.2:1.9$.

Comparative Example 1

A color filter was produced in the same manner as in Example 1, except that the contrasts of the red, green, and blue color patterns in the color filter (the individual contrasts of the color patterns) were changed by controlling the particle diameters of the pigments to be dispersed in the red-, green-, and blue-colored curable resin compositions. In Comparative Example 1, the individual contrasts of the color patterns were as follows: $C_R=989$, $C_G=1761$, and $C_B=1565$, and they were in the following ratio: $C_R:C_G:C_B=1.0:1.8:1.6$.

Comparative Example 2

A color filter was produced in the same manner as in Example 1, except that the contrasts of the red, green, and blue color patterns in the color filter (the individual contrasts of the color patterns) were changed by controlling the particle diameters of the pigments to be dispersed in the red-, green-, and blue-colored curable resin compositions. In Comparative Example 2, the individual contrasts of the color patterns were as follows: $C_R=1979$, $C_G=1786$, and $C_B=1739$; and they were in the following ratio: $C_R:C_G:C_B=1.0:0.9:0.9$.

Comparative Example 3

A color filter was produced in the same manner as in Example 1, except that the contrasts of the red, green, and blue color patterns in the color filter (the individual contrasts of the color patterns) were changed by controlling the particle diameters of the pigments to be dispersed in the red-, green-, and blue-colored curable resin compositions. In Comparative Example 3, the individual contrasts of the color patterns were as follows: $C_R=1237$, $C_G=986$, and $C_B=2408$; and they were in the following ratio: $C_R:C_G:C_B=1.0:0.8:1.9$.

Comparative Example 4

A color filter was produced in the same manner as in Example 1, except that the contrasts of the red, green, and blue color patterns in the color filter (the individual contrasts of the color patterns) were changed by controlling the particle diameters of the pigments to be dispersed in the red-, green-, and blue-colored curable resin compositions. In Comparative Example 4, the individual contrasts of the color patterns were as follows: $C_R=989$, $C_G=1826$, and $C_B=1252$; and they were in the following ratio: $C_R:C_G:C_B=1.0:1.8:1.3$.

Comparative Example 5

A color filter was produced in the same manner as in Example 1, except that the contrasts of the red, green, and blue color patterns in the color filter (the individual contrasts of the color patterns) were changed by controlling the particle diameters of the pigments to be dispersed in the red-, green-, and blue-colored curable resin compositions. In Comparative Example 5, the individual contrasts of the color patterns were as follows: $C_R=733$, $C_G=2241$, and $C_B=2608$; and they were in the following ratio: $C_R:C_G:C_B=1.0:3.1:3.6$.

Comparative Example 6

A color filter was produced in the same manner as in Example 1, except that the contrasts of the red, green, and blue color patterns in the color filter (the individual contrasts of the color patterns) were changed by controlling the particle diameters of the pigments to be dispersed in the red-, green-, and blue-colored curable resin compositions. In Comparative Example 6, the individual contrasts of the color patterns were as follows: $C_R=1237$, $C_G=1264$, and $C_B=1252$; and they were in the following ratio: $C_R:C_G:C_B=1.0:1.0:1.0$.

(Results of Evaluation)

The total contrasts of the color filters of Examples 1 to 4 and Comparative Examples 1 to 6 were determined by the method shown in FIG. 2. Further, by the same method, the quantity of the color shift that occurred on each color filter, that is, the discrepancy between the center coordinate of the chromaticity coordinates at the display of white color and that of the chromaticity coordinates at the display of black color, was determined. The results obtained were as shown in Table 1 below.

Further, liquid crystal displays were produced using the color filters of Examples 1 to 4 and Comparative Examples 1 to 6. Specifically, a transparent electrode film was formed on the surface of each color filter by a DC magnetron sputtering process, in which sputtering was conducted at a substrate temperature of 200° C. using argon and oxygen as an electrical discharge gas and ITO as a target. Subsequently, a polyimide alignment film was formed on the transparent electrode film that had been formed on the surface of each color filter. TN liquid crystal in a necessary amount was dropped on a glass substrate with TFT, and each one of the above color filters was then superposed on this glass substrate. By the use of an ultraviolet curing resin as a sealing material, the two members were bonded to form a cell by exposing them to light in an amount of 400 mJ/cm² while exerting a pressure of 0.3 kgf/cm² to them at room temperature.

In the above-described manner, ten liquid crystal displays comprising the color filters of Examples 1 to 4 and Comparative Examples 1 to 6 were produced. The color shift that occurred on each liquid crystal display was visually observed. The results were as shown in Table 1 below.

TABLE 1

|  | Individual Contrasts of Color Patterns in Color Filter | | | | | Total Contrasts of Color Filter | Quantity of Color Shift | Results of Visual Observation of Liquid Crystal Display |
| --- | --- | --- | --- | --- | --- | --- | --- | --- |
|  | $C_R$ | $C_G$ | $C_B$ | $C_G/C_R$ | $C_B/C_R$ |  | $\Delta xy$ |  |
| EXAMPLE1 | 773 | 1202 | 1956 | 1.6 | 2.5 | 1100 | 0.032 | ○ |
| EXAMPLE2 | 791 | 1761 | 3130 | 2.2 | 4.0 | 1414 | 0.061 | ○ |
| EXAMPLE3 | 989 | 1297 | 1565 | 1.3 | 1.6 | 1228 | 0.045 | ○ |
| EXAMPLE4 | 1087 | 1332 | 2087 | 1.2 | 1.9 | 1309 | 0.014 | ○ |
| COMPARATIVE EXAMPLE1 | 989 | 1761 | 1565 | 1.8 | 1.6 | 1474 | 0.078 | X |
| COMPARATIVE EXAMPLE2 | 1979 | 1786 | 1739 | 0.9 | 0.9 | 1823 | 0.092 | X |
| COMPARATIVE EXAMPLE3 | 1237 | 986 | 2408 | 0.8 | 1.9 | 1101 | 0.081 | X |
| COMPARATIVE EXAMPLE4 | 989 | 1826 | 1252 | 1.8 | 1.3 | 1470 | 0.120 | X |
| COMPARATIVE EXAMPLE5 | 733 | 2241 | 2608 | 3.1 | 3.6 | 1526 | 0.095 | X |
| COMPARATIVE EXAMPLE6 | 1237 | 1264 | 1252 | 1.0 | 1.0 | 1256 | 0.112 | X |

The invention claimed is:

1. A color filter for use in a liquid crystal display, comprising:

red, green, and blue color patterns, contrast $C_R$ of the red color pattern, contrast $C_G$ of the green color pattern, and contrast $C_B$ of the blue color pattern fulfilling the following relationship:

$$C_R < C_G < C_B,$$

as well as the following relationship:

$$C_R:C_G = 1.0:1.2 \text{ to } 1.0:2.5, \text{ and } C_R:C_B = 1.0:1.5 \text{ to } 1.0:4.5.$$

2. The color filter according to claim 1, wherein the $C_R$ and the $C_B$ fulfill the relationship $C_R:C_B = 1.0:1.8$ to $1.0:3.5$.

3. The color filter according to claim 1, wherein the $C_R$ and the $C_B$ fulfill the relationship $C_R:C_B = 1.0:2.0$ to $1.0:2.5$.

4. The color filter according to claim 1, wherein the $C_R$ is 700 or more.

5. A liquid crystal display comprising:

a color filter;
  a liquid crystal driving cell having a plurality of pixels that are in correspondence with red, green, and blue color patterns in the color filter, the liquid crystal driving cell having the function of changing, according to a voltage applied, the state of polarization of light passing through each pixel; and
  a pair of polarizers disposed with the color filter and the liquid crystal driving cell sandwiched between them, having the function of making the color on the liquid crystal display white by transmitting, toward an observer side, light in a first state of polarization that has passed through the liquid crystal driving cell, and of making the color on the liquid crystal display black by shielding light in a second state of polarization that has passed through the liquid crystal driving cell,
  the color filter comprising red, green, and blue color patterns,
  contrast $C_R$ of the red color pattern, contrast $C_G$ of the green color pattern, and contrast $C_B$ of the blue color pattern fulfilling the following relationship:

$$C_R < C_G < C_B,$$

as well as the following relationship:

$$C_R:C_G = 1.0:1.2 \text{ to } 1.0:2.5, \text{ and } C_R:C_B = 1.0:1.5 \text{ to } 1.0:4.5.$$

6. The liquid crystal display according to claim 5, wherein the $C_R$ and the $C_B$ of the red and blue color patterns in the color filter fulfill the relationship $C_R:C_B = 1.0:1.8$ to $1.0:3.5$.

7. The liquid crystal display according to claim 5, wherein the $C_R$ and the $C_B$ of the red and blue color patterns in the color filter fulfill the relationship $C_R:C_B = 1.0:2.0$ to $1.0:2.5$.

8. The liquid crystal display according to claim 5, wherein the $C_R$ of the red color pattern in the color filter is 700 or more.

9. The color filter according to claim 2, wherein the $C_R$ is 700 or more.

10. The color filter according to claim 3, wherein the $C_R$ is 700 or more.

11. The liquid crystal display according to claim 6, wherein the $C_R$ of the red color pattern in the color filter is 700 or more.

12. The liquid crystal display according to claim 7, wherein the $C_R$ of the red color pattern in the color filter is 700 or more.

* * * * *